Patented Dec. 19, 1933

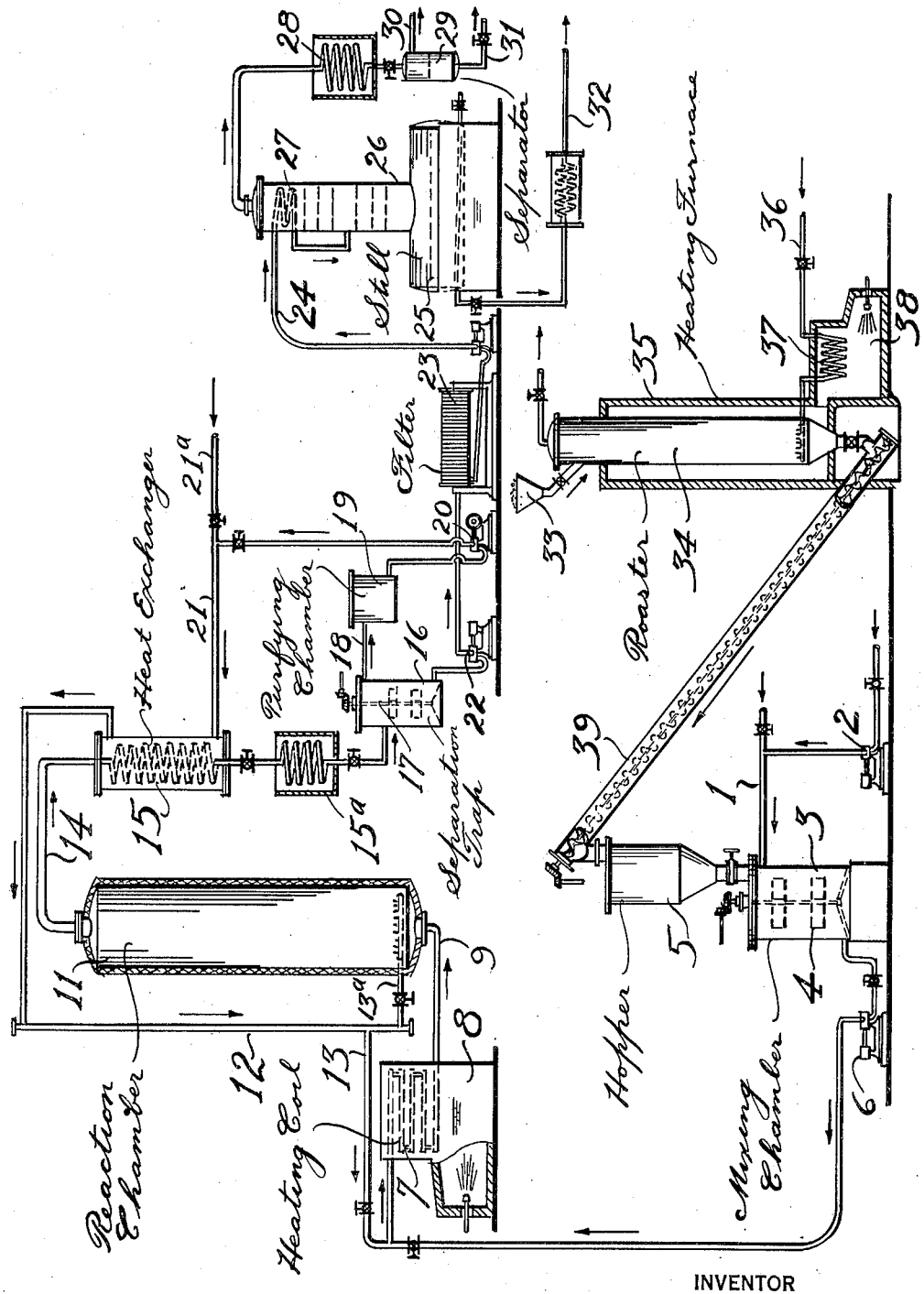

1,940,652

UNITED STATES PATENT OFFICE 1,940,652

CATALYTIC PROCESS FOR OBTAINING VALUABLE REFINED HYDROCARBON OILS FROM HEAVIER UNREFINED PRODUCTS BY THE ACTION OF HIGH PRESSURE HYDROGEN

Harry H. Semmes, Washington, D. C., assignor to Standard-I. G. Company

Application January 30, 1930. Serial No. 424,614

5 Claims. (Cl. 196—78)

This invention relates to an improved process for producing refined hydrocarbon oils from unrefined hydrocarbon materials and more specifically comprises an improved catalytic method for producing high grade lubricating oils from heavy hydrocarbons of a lower grade. My invention will be fully understood from the following description and the drawing which illustrates an apparatus suitable for carrying out the process.

The drawing is a semi-diagrammatic view in sectional elevation of an apparatus constructed according to my invention and indicates the flow of materials through the process. Referring to the drawing hydrocarbon such as crude oil, reduced crude or heavy distillate is withdrawn from any convenient source, not shown, by a pump indicated in the drawing by reference numeral 2, and forced through a line 1 into a convenient mixing chamber 3. The chamber is fitted with a stirring means 4 and the hopper 5 by means of which suitable catalytic material in a granular or finely powdered form may be added to the oil in the mixing chamber and kept in a state of homogeneous suspension by the action of the stirrer 4. The oily suspension is withdrawn by pump 6 and continuously fed through a heating coil 7 which is arranged in a suitable furnace setting 8 and then thru line 9 into and thru a reaction chamber 11. The reaction chamber is adapted to withstand high pressures, for example; in excess of 100 to 200 atmospheres, as well as the corrosive effect of hydrogen and the oil. Gas rich in free hydrogen is supplied by high pressure manifold 12 and is introduced into the inlet of coil 7 thru a branch pipe 13. Part of the hydrogen may also be introduced by line 13a directly into the reaction drum. The drum may be maintained at its elevated temperature either by the action of the coil alone or by suitable heating means such as internal electric heaters, not shown on the drawing. Generally, however, the coil alone is sufficient where the drum is suitably lagged. The total product comprising a mixture of refined hydrocarbons and excess hydrogen flows from the drum by line 14 thru heat exchanger 15 and condenser 15a into a gas separation trap 16. The trap is preferably fitted with a stirring means 17 which is adapted to keep the solid materials in a state of suspension. Gas escapes from the upper portion of the trap by a line 18 which connects with a suitable purifying chamber 19. The purifying system may comprise any suitable means for removing hydrogen sulfide and hydrocarbon constituents from the gas and for this purpose an oil scrubbing tower, operated at high pressures, has been found suitable. Purified gas is compressed by booster 20 and forced thru line 21 and exchanger 15 into a manifold 12 for recirculation and fresh hydrogen may be added by means of branch line 21a from any convenient source for the production of high pressure hydrogen. The oily suspension is withdrawn from trap 16 and forced by pump 22 thru any convenient means for separating the solid material from the liquid and filter 23 may be satisfactorily used for this purpose, although settling drums or centrifugal means may be satisfactorily used. The filtrate is then passed thru a line 24 into a still 25 which may be fitted with a tower 26 and a reflux coil 27 thru which the oil is passed before entering the tower. Light oil is removed as a vapor and condensed in a condenser 28 from which it flows to separator 29. Gas is discharged by a pipe 30 and light oil is removed to storage by a pipe 31. The heavier fraction remaining in the still is withdrawn by a pipe 32 to any convenient storage.

As will be understood, several filters 23 may be used in rotation, while the one is in operation another may be discharging solid cake. The cake is fed thru hopper 33 into any convenient type of roasting furnace which may consist of a shell 34 set in a convenient heating furnace 35. Air or gas is forced thru a line 36 and preheated in a coil 37 which may be placed in a convenient fired setting 38 and is fed from the coil into the base of a shell 34. By this means the solid material is allowed to pass downwardly thru the shell in contact with the gas which is discharged at the top. Solid material is collected from the bottom of the shell and may be conveyed by a conveyor 39 to the top of hopper 5 into which it is discharged for reuse, if desired.

It is well known in the art that the ordinary hydrogenating catalysts are very sensitive to sulphur and other catalyst poisons which occur to a large extent in almost all petroleum products. For this reason it has been very difficult to hydrogenate crude oil of any cuts therefrom since the catalytic material rapidly loses its activity. Sulphur immune catalysts have been disclosed for this purpose, but such catalysts are generally very costly and to my knowledge are not so active as other catalysts which are poisoned by sulphur or other materials. I have discovered methods by which it is feasible to secure the high activity of catalysts such as nickel, cobalt and iron or their oxides and the like, for the hydrogenation or destructive hydrogenation in spite of the fact that they are readily poisoned by sulphur, due to formation of inactive metal sulfides.

In the operation of my process I rapidly pass the oil containing suspended catalytic material with a large excess of hydrogen, say 3000 to 10,000 cubic feet per barrel of oil, thru a heating coil to rapidly attain an elevated temperature, for example above about 700° F. or preferably between 750° F. and 870° F. The mixture of heavy oil, hydrogen and catalyst is then forced thru the reaction zone at a rate of about .2 to .8 volumes per hour per volume of reactor space and the reactor is preferably suitably elongated so that the linear velocity is relatively high to prevent settling of the catalyst. Pressure is in excess of about 50 atmospheres and is preferably much higher to insure keeping the major quantity of the oil in the liquid phase. The total product comprising liquid oil, gas and vaporized hydrocarbons is continuously removed from the reactor and passed thru a condenser into a trap. Uncondensed gas is removed from the trap and the liquid oil is likewise removed and separated from the suspended catalytic material. The oil may be distilled into various useful products, for example; the lighter fractions may be used for gasoline and kerosene, while the heavier fractions have desirable lubricating properties. The amount of the catalyst may vary considerably, but it is preferable to add sufficient quantity in proportion to the rate of flow so that a part of the catalyst is not poisoned in its flow thru the reaction chamber. As will be understood, the quantity and the rate of flow vary considerably with the quality of the oil and particular characteristics of the catalyst, but the proper amount generally varies from about 5 to 50% of the volume of oil. The proper amount can be easily determined by test. The rapidity with which the catalytic agent is poisoned depends on the nature of the particular catalyst used and also on the amount of sulphur or other poisons which may be present in the oil. My process, of course, operates most successfully on oils in which there is a relatively small quantity of sulphur, but it may be used successfully on any type of crude oil, coal tar or other liquid or liquefied hydrocarbon. As catalytic agents I use copper, zinc, nickel, cobalt and iron as metals or as oxides, but it will be understood that other suitable materials having the characteristics of promoting hydrogenation reactions and being subject to sulphur poisoning under the operating conditions may be used. The spent catalytic material may then be washed and dried in any suitable manner and may be reactivated, the particular method preferred depending on the nature of the particular material. For example; catalysts such as nickel and cobalt or other metals or oxides, may be dissolved in acids and reprecipitated in a purified form for reuse. Such materials may also be obtained in purified form by the action of purifying gases, for example; the material may be subjected at a high temperature to air or oxygen under roasting conditions suitable for removing sulphur in the form of sulphur dioxide.

By the use of my process I am able to obtain large yields of valuable lubricating oils of improved lubricating characteristics, for example; I am able to obtain oils of Pennsylvania type from such crudes as Texas, Coastal and Colombian. A part of the oil is converted into low boiling material suitable in boiling range for commercial gasoline, that is to say, boiling below about 400° F., but it is ordinarily desirable to limit the production of such light oils to less than about 10 or 20% of the crude. Lubricating oils produced by my process are marked by low Conradson carbon values and an extremely high flash for their viscosity. Little or no carbonaceous material is precipitated in the coil or reaction chamber and there is no formation of tar or asphaltic products. In fact, such material if present in the raw oil may be completely eliminated.

While the process has been described in connection with the production of lubricating oils, it should be understood that the process is applicable to the production of large yields of gasoline, even equal to 100% of the volume of the oil fed. In such case the temperatures and feed rate are higher than the given values and it is desirable to recirculate the heavier portions obtained from still 25.

My invention is not to be limited by any theory of the mechanism of the reactions nor to any specific example which may have been given for the purpose of illustration, but only by the following claims in which I wish to claim all novelty inherent in my invention.

I claim:

1. A continuous process for obtaining valuable lubricating oils by the hydrogenation of heavy unrefined sulfur-containing hydrocarbon oil, which comprises suspending in such an unrefined oil a catalytic material which promotes hydrogenation but is subject to sulfur poisoning comprising a substance selected from the group of iron, nickel cobalt and their oxides, continuously passing the suspension through a reaction zone maintained under pressure of hydrogen in excess of 50 atmospheres and at temperature above 700° F., continuously withdrawing vapor and gas and a liquid suspension of said catalyst as soon as poisoned from the reaction zone, cooling the said withdrawn suspension, separating the suspended catalyst therefrom, regenerating the hydrogenating activity thereof by roasting, and returning it to the reaction zone.

2. Process according to claim 1 in which the quantity of catalytic material suspended in the oil is between 5 and 50% of the volume of the oil and the rate of flow of the suspension through the reaction zone is between .2 and .8 volumes per volume of reactor space per hour.

3. Process according to claim 1 in which the quantity of catalyst and rate of flow of suspension are adjusted to prevent complete poisoning of the catalyst in the reaction zone.

4. Process according to claim 1 in which a catalyst of a metallic nature, readily convertible into an inactive sulfide, is used.

5. A continuous process for producing high grade lubricants by the hydrogenation of heavy sulfur containing hydrocarbon oil in the presence of a catalytic material whose hydrogenating activity is substantially impaired by sulfur comprising a substance selected from the group of iron, nickel cobalt and their oxides, which comprises suspending such catalytic material in the heavy hydrocarbon oil, continuously passing the suspension through a reaction zone maintained under pressure of hydrogen between 50 and 200 atmospheres and at temperature between 700 and 870° F., continuously withdrawing vapor and gas and a liquid suspension of said catalyst as soon as poisoned from the reaction zone, cooling the said withdrawn suspension, separating the catalytic material therefrom, removing the sulfur from the catalyst by roasting and then returning it with fresh oil to the reaction zone.

HARRY H. SEMMES.